US012641037B2

(12) United States Patent
Masri et al.

(10) Patent No.: US 12,641,037 B2
(45) Date of Patent: May 26, 2026

(54) DATA PROCESSING METHOD, ELECTRONIC DEVICE, AND STORAGE MEDIUM

(71) Applicants: Lemon Inc., Grand Cayman (KY); Beijing Youzhuju Network Technology Co., Ltd., Beijing (CN)

(72) Inventors: Nabil Masri, Los Angeles, CA (US); Jun Zheng, Los Angeles, CA (US); Qian Zhang, Beijing (CN); Shiwen Wang, Beijing (CN); Jian Wang, Beijing (CN)

(73) Assignees: Lemon Inc., Grand Cayman (KY); Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/081,851

(22) Filed: Mar. 17, 2025

(65) Prior Publication Data

US 2025/0293993 A1     Sep. 18, 2025

(30) Foreign Application Priority Data

Mar. 18, 2024    (CN) .......................... 202410310864.7

(51) Int. Cl.
　　 *H04L 49/103*　　　(2022.01)
　　 *H04L 47/32*　　　(2022.01)
(52) U.S. Cl.
　　 CPC ............ *H04L 49/103* (2013.01); *H04L 47/32* (2013.01)
(58) Field of Classification Search
　　 CPC ............ G06F 12/0817; G06F 12/0806; G06F 13/1663; G06F 13/364; G06F 12/0808; G06F 13/4282; G06F 12/0824
　　 See application file for complete search history.

(56) References Cited

U.S. PATENT DOCUMENTS

2002/0133491 A1*　9/2002　Sim ......................... H04L 69/14
2007/0286121 A1*　12/2007　Kolakowski ........ H04L 65/1101
　　　　　　　　　　　　　　　　370/328
(Continued)

FOREIGN PATENT DOCUMENTS

CN　　　105100874 A　*　11/2015　......... H04N 21/4335
CN　　　112235829 A　　　1/2021
(Continued)

OTHER PUBLICATIONS

International Patent Application No. PCT/CN2025/082960; Int'l Written Opinion and Search Report; dated Jun. 13, 2025; 11 pages.

*Primary Examiner* — Kibrom T Hailu
*Assistant Examiner* — Bao G Nguyen
(74) *Attorney, Agent, or Firm* — BakerHostetler

(57)　　　　　　　　ABSTRACT

Embodiments of the present disclosure provide a data processing method, an electronic device, and a storage medium. The data processing method includes: determining, in a receive agent node in response to receiving a first request data packet, a number of available buffer units in a request receiving buffer used to receive the first request data packet; and discarding, in response to the number of available buffer units being less than or equal to a first threshold, at least one request data packet stored in the request receiving buffer. The method can ensure that there is at least one available buffer unit in a buffer of the receive agent node for receiving or storing requests, thereby preventing congestion or deadlock in an interconnect network-on-chip and improving the performance of the interconnect network-on-chip.

19 Claims, 4 Drawing Sheets

(56)                References Cited

U.S. PATENT DOCUMENTS

2013/0290514 A1 * 10/2013 McGowan ............. H04L 65/60
                                                        709/224
2019/0205280 A1 *  7/2019 Kalyanasundharam ....................
                                                        G06F 12/0817
2020/0089649 A1    3/2020 Pandya et al.
2021/0248087 A1 *  8/2021 Pan ..................... G06F 12/0893
2025/0106311 A1 *  3/2025 Singh ...................... H04L 41/16

FOREIGN PATENT DOCUMENTS

CN          113300983  A     8/2021
CN          117608816  A     2/2024
WO     WO 2019/211611 A1    11/2019

* cited by examiner

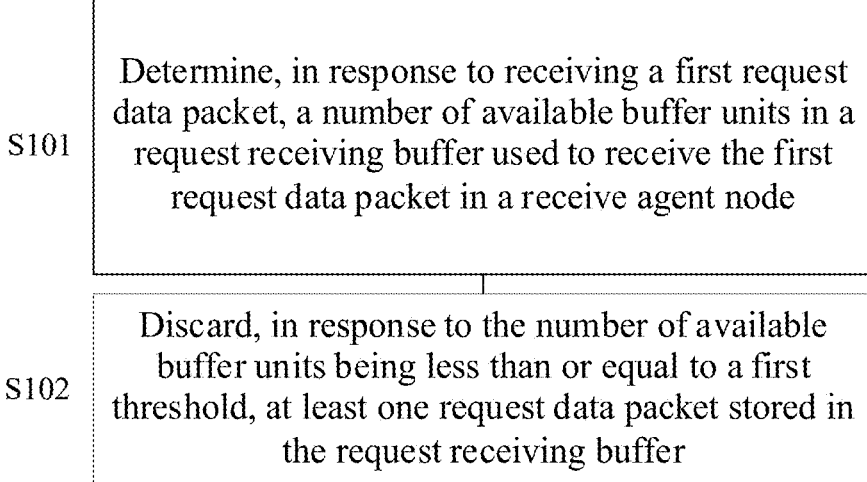

S101 — Determine, in response to receiving a first request data packet, a number of available buffer units in a request receiving buffer used to receive the first request data packet in a receive agent node S102 — Discard, in response to the number of available buffer units being less than or equal to a first threshold, at least one request data packet stored in the request receiving buffer

FIG. 2

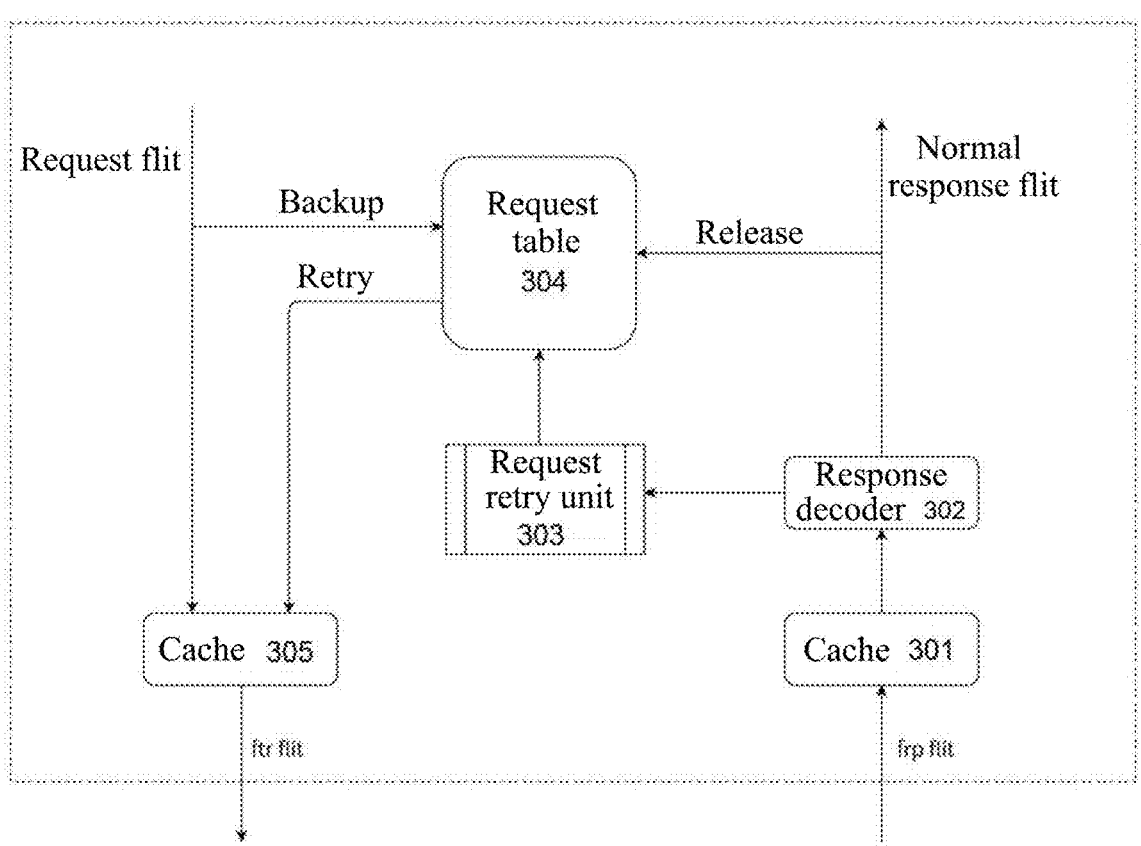

DATA PROCESSING METHOD, ELECTRONIC DEVICE, AND STORAGE MEDIUM

CROSS-REFERENCE TO RELATED APPLICATION

The present application claims the priority and benefits of Chinese Patent Application No. 202410310864.7, filed on Mar. 18, 2024, which is incorporated herein by reference in its entirety as part of the present application.

TECHNICAL FIELD

The present disclosure relates to a data processing method, an electronic device, and a non-transitory storage medium.

BACKGROUND

In computer networks and networks-on-chip, network congestion or deadlock may occur because data traffic in the network exceeds the processing capacity of network devices (such as routers or switches), resulting in degraded network performance, an increased data transmission delay, or even data loss. Network congestion may have negative impact on data transmission and communication in the networks, and reduce network efficiency and reliability, resulting in a decrease in a throughput and an increase in a transmission latency. However, application scenarios with higher throughput requirements are more prone to network congestion or deadlock. How to prevent network congestion or deadlock is a crucial technology in computer networks and networks-on-chip.

SUMMARY

At least one embodiment of the present disclosure provides a data processing method. The data processing method includes: determining, in response to receiving a first request data packet, a number of available buffer units in a request receiving buffer used to receive the first request data packet in a receive agent node; and discarding, in response to the number of available buffer units being less than or equal to a first threshold, at least one request data packet stored in the request receiving buffer.

At least one embodiment of the present disclosure further provides a data processing apparatus, including a request agent node and a receive agent node, the request agent node is configured to initiate a first request data packet, and the receive agent node is configured to determine, in response to receiving the first request data packet, a number of available buffer units in a request receiving buffer used to receive the first request data packet; and discard, in response to the number of available buffer units being less than or equal to a first threshold, at least one request data packet stored in the request receiving buffer.

At least one embodiment of the present disclosure further provides an electronic device, including a memory and a processor, where the memory is configured to store computer-executable instructions; and the processor is configured to execute the computer-executable instructions, where when the computer-executable instructions are executed by the processor, the method according to any of the above embodiments is implemented.

At least one embodiment of the present disclosure further provides a non-transitory storage medium, storing computer-executable instructions in a non-transitory manner, where when the computer-executable instructions are executed by a processor, the method according to any one of the above embodiments is implemented.

BRIEF DESCRIPTION OF DRAWINGS

In order to illustrate the technical solutions of the embodiments of the present disclosure more clearly, the drawings of the embodiments will be briefly described below. Obviously, the drawings in the following description only relate to some embodiments of the present disclosure, and are not intended to limit the present disclosure.

FIG. 2 is a schematic flowchart of a data processing method according to at least one embodiment of the present disclosure;

FIG. 3 is a schematic diagram of an operating principle of a request agent node according to at least one embodiment of the present disclosure;

DETAILED DESCRIPTION

Figure 1:
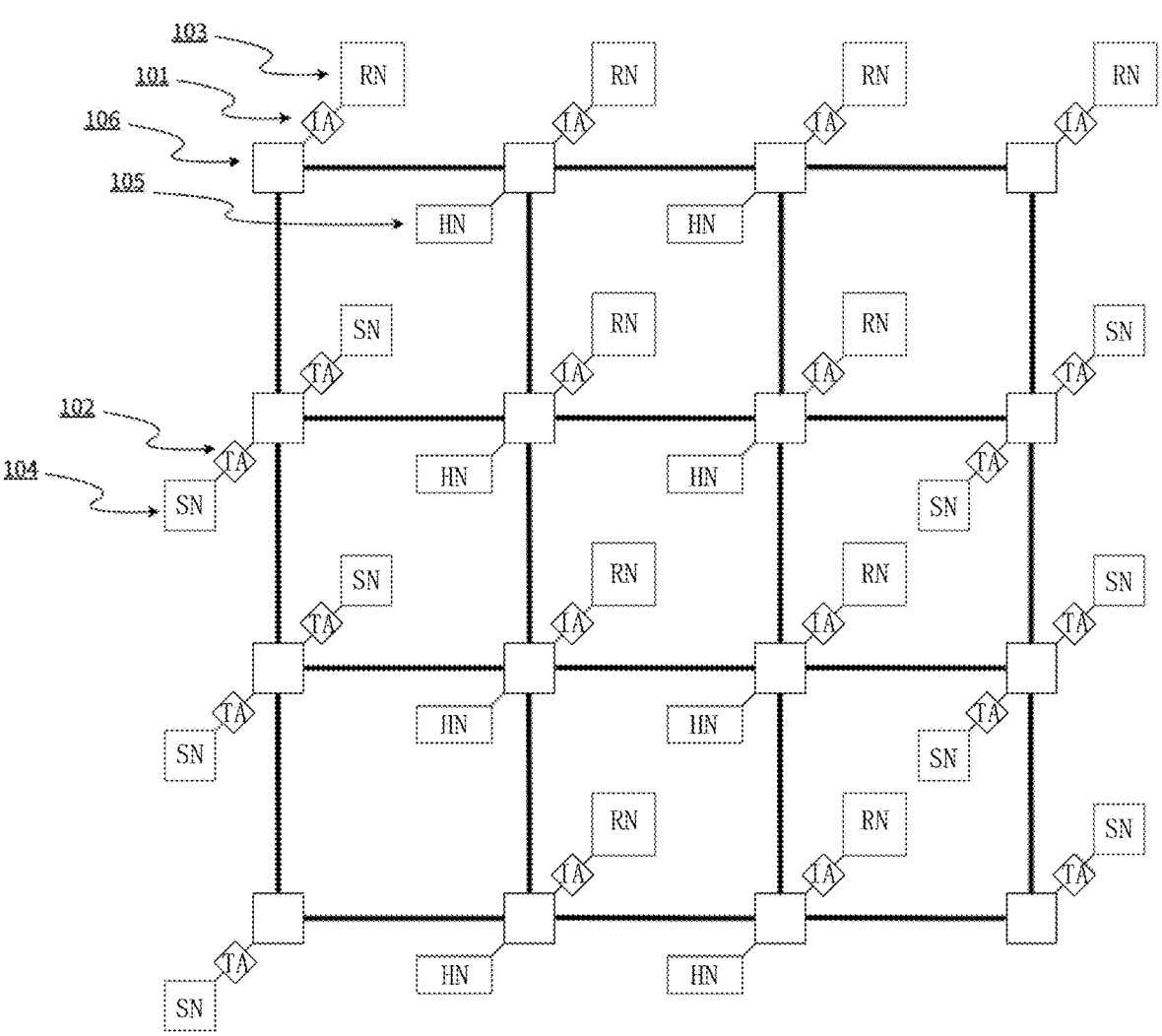
FIG. 1 is a schematic diagram of a system-on-chip (SOC) including a network-on-chip (NOC)

In order to make the objects, technical solutions, and advantages of embodiments of the present disclosure clearer, the technical solutions in the embodiments of the present disclosure will be clearly and completely described below with reference to the drawings of the embodiments of the present disclosure. Apparently, the described embodiments are some rather than all of the embodiments of the present disclosure. Based on the described embodiments of the present disclosure, all other embodiments obtained by those of ordinary skill in the art without any inventive effort shall fall within the scope of protection of the present disclosure.

Unless otherwise defined, the technical or scientific terms used in the present disclosure shall have general meanings as understood by those of ordinary skill in the art to which the present disclosure pertains. "First", "second", and like words used in the present disclosure do not indicate any order, quantity, or importance, but are merely used to distinguish between different components. "Include" or "comprise" or like words mean that an element or item preceding the term encompasses an element or item or its equivalent listed after the term, without excluding other elements or items. "Connect" or "connected" or like words are not limited to a physical or mechanical connection, but may include an electrical connection, whether director indirect. "Up", "down", "left", "right", and the like are merely used to indicate a relative positional relationship, and the relative positional relationship may change accordingly when an absolute position of the described object changes.

Detailed description of some known functions and known components is omitted in the present disclosure, to make the following description of the embodiments of the present disclosure clear and concise.

A system-on-chip (SoC) includes a processor core, a memory, an input/output interface, a controller, and other related functional modules. A network-on-chip (NoC) is an important component inside the system-on-chip, and is a network structure implemented on a chip, which is used to connect various functional modules and processing units within the chip. The network-on-chip is usually used to perform data transmission and communication within the chip to implement efficient data exchange and communication. The design and implementation of the network-on-chip has important impact on the performance and efficiency of the system-on-chip, because the design and implementation directly affect the communication speed and data transmission efficiency between the various functional modules.

With the rapid development of the very-large-scale integrated circuit technology, the scale of processor chips is also increasing. A plurality of processor cores are integrated within a single chip, and instead of a bus, the network-on-chip is used to provide data transmission services between the processor cores. Therefore, the network-on-chip plays an important role. Because resources on the chip are very limited and transmission of a large amount of data are often localized, there is a tendency to uneven network load on the network-on-chip in practical application scenarios, which may cause network congestion or even deadlock.

Coherent hub interface interconnect based on a coherent hub interface (CHI) has been widely used in chip design. The CHI provides a comprehensive set of hierarchical specifications useful for building systems of different scales (such as a system-on-chip). The system includes a plurality of components that communicate using scalable and coherent interfaces and on-chip interconnect. For example, the ARM coherent mesh network (CMN) uses the CHI architecture specification. The CMN communicates based on basic data units (e.g., a traffic control unit or a data packet unit (flit)) transmitted on a network-on-chip, and has four types of channels (a request channel, a response channel, a snoop channel, and a data channel). The traffic control of the CMN uses a protocol layer retry mechanism to implement bandwidth and resource allocation. In addition, the CMN further integrates end-to-end quality of service (QoS) functions. When a slave node does not have sufficient resources to receive a request, a protocol retry mechanism is provided to indicate the availability of resources to avoid blocking of the request channel. The slave node may be responsible for determining and recording the type of protocol credit required to process the request. Another conventional solution in network interconnection is to use different routing schemes to minimize network congestion. Although these routing algorithms provide alternatives, the routing algorithms are relatively complex to implement, cannot guarantee deadlock-freeness, and cannot provide a path for transferring high-priority request data packets to a destination.

Therefore, the inventor has noted that there is a need for a technology that avoids blocking of a request channel of a network-on-chip, ensure that the network-on-chip is free of deadlock, and provide a path for preferentially rapidly transferring high-priority request data packets to a destination.

At least one embodiment of the present disclosure provides a data processing method. For example, the data processing method provided in the present disclosure includes: determining, in response to receiving a first request data packet, a number of available buffer units in a request receiving buffer used to receive the first request data packet in a receive agent node; and discarding, in response to the number of available buffer units being less than or equal to a first threshold, at least one request data packet stored in the request receiving buffer.

In the foregoing data processing method provided in the present disclosure, an internal retry mechanism is provided. In the mechanism, at least one request data packet in a buffer of the receive agent node for receiving or storing requests is discarded and an internal retry response is generated to the request agent node for the discarded request data packet, and the request agent node re-sends the discarded request data packet to the receive agent node after the request agent node detects the internal retry response, so that it can be ensured that there is at least one available buffer unit (or available credit) in the buffer of the receive agent node for receiving or storing requests, thereby preventing congestion or deadlock in a network-on-chip, and it can also be ensured there is a path for rapidly transferring high-priority request data packets to a destination even in congestion scenarios.

At least one embodiment of the present disclosure further provides a data processing apparatus. The data processing apparatus includes a request agent node and a receive agent node. The request agent node is configured to initiate a first request data packet, and the receive agent node is configured to: determine, in response to receiving the first request data packet, a number of available buffer units in a request receiving buffer used to receive the first request data packet; and discard, in response to the number of available buffer units being less than or equal to a first threshold, at least one request data packet stored in the request receiving buffer.

The technical effects of the data processing apparatus in the above embodiment of the present disclosure are the same as the technical effects of the foregoing data processing method, and therefore will not be repeated.

Various embodiments of the present disclosure will be described below in conjunction with specific examples.

FIG. 1 is a schematic diagram of a system-on-chip (SOC) including a network-on-chip (NOC).

In the SOC shown in FIG. 1, a master device 103 communicates with a slave device 104 via the NOC. The NOC includes a request agent node 101, an interconnect fabric, a receive agent node 102, and a coherent node (HN) 105. The interconnect fabric includes a plurality of routers 106 and connection lines connected between the plurality of routers 106 for communication between the routers, or the plurality of routers 106 may communicate over a wireless network.

It should be noted that although the present disclosure is described by using the SOC in FIG. 1 as an example, that is merely for convenience of clearly illustrating the technology of the present disclosure. For example, FIG. 1 may show a larger computer system in practice. The present disclosure does not impose specific limitations on the scope of application of FIG. 1, provided that objects to which the technical idea of the present disclosure is applicable are all within the scope of protection of the present disclosure.

For example, the master device 103 may be referred to as a request node (RN), and the master device 103 may be a different host or processor (or core). The request agent node 101 may also be referred to as an initiator agent (IA). The request agent node 101 may act as a communication bridge between the master device 103 and the interconnect fabric, and may receive a request from the master device 103 and respond to the request. For example, the request agent node 101 may be responsible for handling communications requests, routing scheduling, data transmission, and other tasks to ensure that data can be efficiently transmitted in the network. The router 106 may be used to connect and provide routing functionality between the various components in the NOC.

For example, the router 106 may act as a communication bridge between the request agent node 101, the receive agent node 102, and the coherent node 105, and provide communication routing functionality between the request agent node 101, the receive agent node 102, and the coherent node 105.

For example, the coherent node 105 may also be referred to as a home node (HN), and the coherent node 105 may be responsible for maintaining the coherency of caches in the system (e.g., system-on-chip). The coherent node 105 may act as a receive agent node when receiving request data packets (or flits) from the request agent node 101, and may act as a request agent node when receiving request data packets from the receive agent node 102. The coherent node 105 may be a node responsible for maintaining data coherency in a distributed system or a multi-processor (multi-core) system to ensure data access coherency between a plurality of processors or storage units to avoid problems caused by data incoherency. The coherent node 105 may handle tasks such as cache coherence protocols, memory access requests, and data updates to ensure data coherency in the system.

The receive agent node 102 may also be referred to as a target agent (TA), and the receive agent node 102 may act as a communication bridge between the interconnect fabric and the slave device 104, and may receive requests from the coherent node 105 and the request agent node 101 and respond to the requests. For example, the receive agent node 102 may be used in the network-on-chip to receive and process communication requests from the request agent node 101, and is responsible for receiving data, performing processing and responding, and coordinating with the request agent node 101 to ensure that the data can be efficiently transmitted and processed in the network. The slave device 104 may also be referred to as a subordinate node (subordinate node, SN), for example, the slave device 104 may be a storage (e.g., a memory, a cache, etc.) or a device (e.g., various communication devices).

For example, the receive agent node 102 and the request agent node 101 communicate over the interconnect fabric, the request agent node 101 is located between the interconnect fabric and the master device 103 initiating a request data packet and is used to send the request data packet to the receive agent node, and the receive agent node 102 is located between the interconnect fabric and the slave device 104 receiving the request data packet and is used to receive from the interconnect fabric the request data packet from the master device 103.

It should be noted that the mesh structure of the NOC shown in FIG. 1 is merely exemplary, or the structure of the NOC may be of various other types, depending on specific application and design requirements. For example, the NOC may alternatively include, but is not limited to, a tree structure in which nodes are connected in a tree hierarchy, an adaptive structure in which connections and routing between nodes may be dynamically adjusted based on a communication load and a system status, a custom structure created by a designer, etc. The various components in the SOC shown in FIG. 1 (e.g., the master device 103, the slave device 104, the request agent node 101, the interconnect fabric, the receive agent node 102, the coherent node 105, etc.) may be adjusted according to actual needs. Although the present disclosure generally describes FIG. 1 as an SOC above, the technology of the present disclosure is not limited to the SOC, and the schematic diagram shown in FIG. 1 may alternatively be a distributed system including a plurality of hosts.

FIG. 2 is a schematic flowchart of a data processing method according to at least one embodiment of the present disclosure. As shown in FIG. 2, in some embodiments of the present disclosure, the data processing method includes the following steps S101 and S102.

Step S101: Determine, in response to receiving a first request data packet, a number of available buffer units in a request receiving buffer used to receive the first request data packet in a receive agent node.

Step S102: Discard, in response to the number of available buffer units being less than or equal to a first threshold, at least one request data packet stored in the request receiving buffer.

Figure 4:
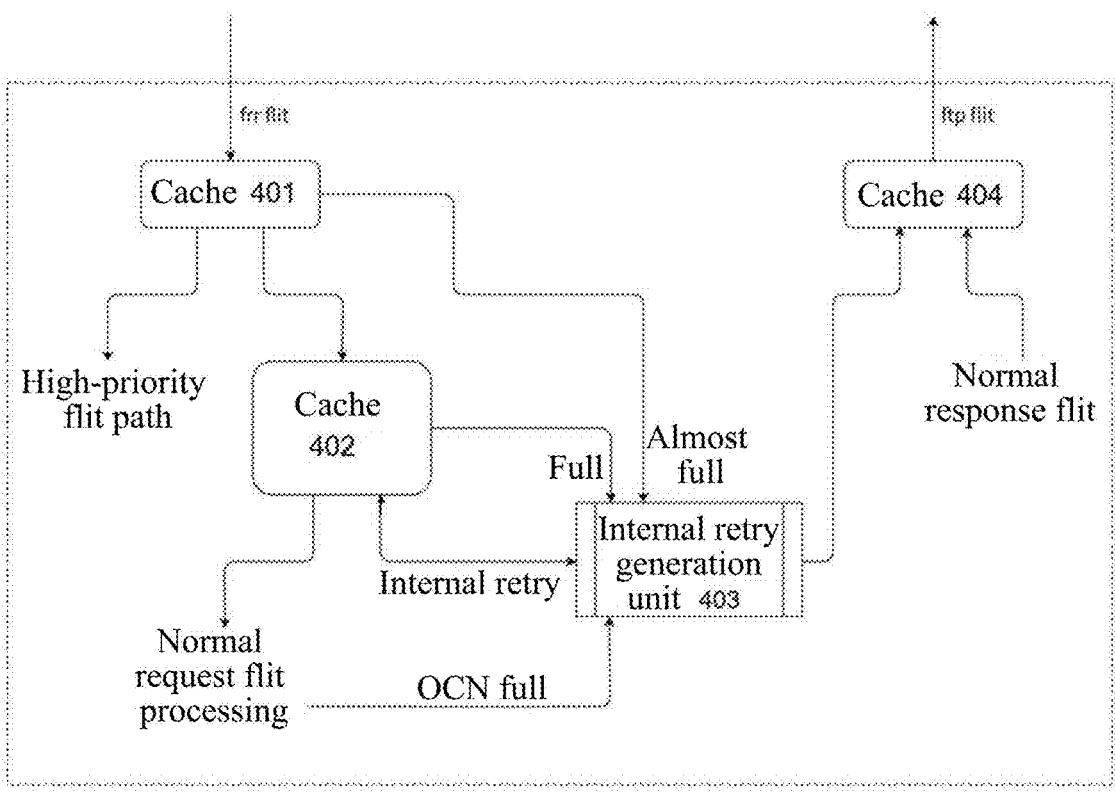
FIG. 4 is a schematic diagram of an operating principle of a receive agent node according to at least one embodiment of the present disclosure.

FIG. 3 is a schematic diagram of an operating principle of a request agent node according to at least one embodiment of the present disclosure. FIG. 4 is a schematic diagram of an operating principle of a receive agent node according to at least one embodiment of the present disclosure.

The request agent node shown in FIG. 3 may be the request agent node 101 or the coherent node 105 shown in FIG. 1, and the receive agent node shown in FIG. 4 may be the receive agent node 102 or the coherent node 105 shown in FIG. 1. For example, the coherent node 105 may include both the request agent node shown in FIG. 3 and the receive agent node shown in FIG. 4.

For example, the coherent node 105 may implement the function of the request agent node with a request agent node functional module included therein, and implement the function of the receive agent node with a receive agent node functional module included therein.

When a core or processing unit needs to communicate or transmit data, the core or processing unit may send a request (e.g., a request data packet or a fabric transmit request (ftr flit, fabric transmit request flit)) to the request agent node. For example, the request may include a data source address, an address of a target node, a data type, a transmission mode, and other information. For example, as shown in FIG. 3, after receiving a request data packet from the master device, the request agent node may store the request data packet in a cache 305, and then send the request data packet to the receive agent node shown in FIG. 4 for processing. For example, the request agent node may alternatively back up the received request data packet in a request table 304 thereof, and may not clear the backup data until a response to the request data packet returned from the receive agent node indicates that the backup data can be released. For example, after the request agent node sends a request data packet to the receive agent node for processing, if a response (e.g., the frp flit in FIG. 3) is received from the receive agent node that indicates that the request data packet has been received and completely processed, the request agent node may clear or release data backed up in the request table 304 that corresponds to the request data packet.

For example, after the request agent node receives the response (e.g., the frp flit in FIG. 3) from the receive agent node to the request data packet, the request agent node may store the response data in a cache 301, and then decode the response by using a response decoder 302 to obtain data information in the response. For example, the request agent node may feed back to the master device a processing status of the request data packet by returning a response flit to the master device (e.g., the normal response flit in FIG. 3).

The receive agent node shown in FIG. 4 may be the receive agent node 102 or the coherent node 105 shown in FIG. 1. For example, in response to receiving the request data packet (e.g., the frr flit in FIG. 4) from the request agent node, the receive agent node determines, in the receive agent node, the number of available buffer units in the request receiving buffer used to receive the request data packet. For example, the available buffer unit may be of the size of usable space in the buffer for receiving or storing the request data packet received from the request agent node (e.g., indicating the number of flits that can be stored). For example, the request receiving buffer includes a first request receiving buffer (e.g., a cache 401) and a second request receiving buffer (e.g., a cache 402). The first request receiving buffer is used to receive the request data packet and cache at least part of the received request data packet in the second request receiving buffer. It should be noted that although FIG. 4 specifically illustrates the case where the request receiving buffer includes two caches, namely, the cache 401 and the cache 402, the present disclosure does not impose limitations thereon, and the request receiving buffer may include only one cache or two or more caches. The number of caches included in the request receiving buffer may be set according to actual needs.

For example, the storage capacity of the first request receiving buffer may be small, for example, two or three flits may be stored therein. The present disclosure does not impose any limitation on the storage capacity of the first request receiving buffer. The storage capacity of the first request receiving buffer may alternatively be a size that can store any number of flits other than two or three flits. For example, the storage capacity of the first request receiving buffer may be less than the storage capacity of the second request receiving buffer to ensure a speed at which cached request data packets are read in the first request receiving buffer, and a larger storage capacity of the second request receiving buffer may also enable receiving or storing more request data packets or flits from the request agent node, thereby alleviating or preventing interconnect back pressure in the NOC.

For example, in response to the number of available buffer units being less than or equal to the first threshold, the receive agent node discards at least one request data packet stored in the request receiving buffer. For example, the following description assumes that the first threshold is 1, but the present disclosure is not limited thereto, and the first threshold may be any other suitable value, such as 2, 3, or a larger or smaller value.

For example, in response to the number of available buffer units in the first request receiving buffer being less than or equal to the first threshold and no free space existing in the second request receiving buffer, at least one request data packet stored in the second request receiving buffer is discarded.

For example, in response to the number of available buffer units being less than or equal to 1, the receive agent node discards the at least one request data packet stored in the request receiving buffer. For example, when the receive agent node receives the request data packet from the request agent node, if the receive agent node determines that the number of available buffer units or the number of storable data packets in the cache 401 is 1 (e.g., the number being 1 indicates that the cache 401 is in an almost-full state; however, the present disclosure does not particularly limit the number of available buffer units or the number of storable data packets in the cache 401 in the almost-full state, which may be any other suitable value than 1, for example, 2 or 3 or a larger value), and there is no available number of buffer units or space in the cache 402 to store data packets (this indicates that the cache 402 is in a full state or an already-full state), the receive agent node discards at least one request data packet stored in the cache 402. For example, the receive agent node sends an internal retry signal via an internal retry generation unit 403 to the cache 402 to notify the cache 402 to discard the at least one request data packet. For example, the receive agent node sends one or more data packets from the cache 402 to the internal retry generation unit 403, such that the cache 402 has a vacated available buffer unit to receive or store a request data packet from the cache 401, thereby ensuring that the cache 401 normally maintains at least one available buffer unit.

For example, after the cache 402 sends a request data packet to destination logic for processing through a normal request flit processing path, if the destination logic is in an already-full state (i.e., there are no free logical units to receive and process the request data packet from the cache 402), then the destination logic may feed back an OCN (outstanding credit number) being in a full state to the internal retry generation unit 403. For example, when the internal retry generation unit 403 determines that the OCN of the destination logic is full, the cache 402 is full, and the cache 401 is almost full, the internal retry generation unit 403 sends an internal retry signal to the cache 402 to notify the cache 402 to discard the at least one request data packet.

For example, when the cache 401 normally maintains at least one available buffer unit, the receive agent node may receive any request data packet from the request agent node at any time, and cache, when the cache 401 is in an almost-full state, a request data packet that is received or has been cached, in the cache 402. For example, if the cache 402 needs to receive the request data packet from the cache 401 and the cache 402 is full, the receive agent node may discard the at least one request data packet in the cache 402 to make cache space for the request data packet from the cache 401 that needs to be received or cached.

For example, the cache 402 may send the cached request data packet to a destination of a response for processing. For example, as shown in FIG. 4, the cache 402 may send the cached request data packet to the destination or corresponding logic through the normal request flit processing path.

For example, because the cache 401 may regularly maintain at least one available buffer unit, the receive agent node may receive a request data packet from the request agent node at any time. For example, as shown in FIG. 4, when the cache 401 receives a request data packet with a high priority from the request agent node, the high-priority request data packet may not be cached in the cache 402. Instead, the high-priority request data packet is sent to a destination for processing through a high-priority flit path. For example, a storage space of the cache 401 may be small. For example, the storage space or number of available buffer units of the cache 401 may be 2 or 3, but this embodiment of the present disclosure is not limited thereto. The storage space or number of available buffer units of the cache 401 may be set to any other value as desired. Herein, because the storage space of the cache 401 is small, the speed of reading request data packets (e.g., high-priority request data packets) from the cache 401 is high, allowing the high-priority request data packet to be quickly transferred to a path of the destination for processing.

For example, the number of available buffer units may be a minimum storage unit in the cache. For example, one minimum storage unit may store one request data packet or flit. For example, a high-priority or critical flit path will always be non-blocking, thereby ensuring that high-priority or critical flits will never be blocked (i.e., they can certainly be received by the receive agent node and sent to a destination for processing). For example, the high-priority flit may be a flit related to a read/write operation of a CSR (control and status register). It should be noted that the present disclosure does not impose any specific limitation on a high priority, and whether a request data packet is a priority request data packet may be flexibly set according to different criteria in practice.

For example, in response to the number of available buffer units being less than or equal to the first threshold, at least one request data packet that is earliest stored in the request receiving buffer is discarded. For example, in response to the number of available buffer units being less than or equal to the first threshold, at least one request data packet that is earliest stored in the cache 402 is discarded. For example, if the cache 402 uses first in, first out (FIFO), when new data enters the cache 402, the new data is added to the tail of a queue, and when data needs to be deleted or discarded, the data is always deleted or discarded from the head of the queue. For example, when the at least one request data packet stored in the request receiving buffer needs to be discarded, a data packet that first enters the cache 402 is discarded first. It should be noted that the present disclosure does not impose any limitation on the type of the cache 402, provided that the cache has a storage function. For example, when the at least one request data packet stored in the request receiving buffer needs to be discarded, the discarded request data packet may be a data packet at any position in the cache 402, or data in the cache 402 may be discarded in any predetermined order or priority. The present disclosure does not impose any specific limitation thereon, provided that the cache 402 can have the function of discarding data packets stored therein.

For example, in response to the at least one request data packet stored in the request receiving buffer being discarded, a retransmission request data packet is generated based on the discarded request data packet and the retransmission request data packet is sent to the request agent node. For example, after the internal retry generation unit 403 receives the at least one request data packet discarded by the cache 402, a source address and a destination address in each of the discarded at least one request data packet are swapped to generate the retransmission request data packet. For example, the internal retry generation unit 403 sends the generated retransmission request data packet to the request agent node based on the swapped destination address. For example, the internal retry generation unit 403 first caches the generated retransmission request data packet in a cache 404 based on the swapped destination address, and the receive agent node then sends the retransmission request data packet to the request agent node via the cache 404.

For example, when data of the receive agent node to be sent to the request agent node includes a retransmission request data packet and a response data packet, the retransmission request data packet is preferentially sent to the request agent node relative to the response data packet, where the response data packet is response data of the receive agent node to the received request data packet. For example, when data cached in the cache 404 to be sent to the request agent node includes a retransmission request data packet and a response data packet, the retransmission request data packet is preferentially sent to the request agent node relative to the response data packet. For example, the response data packet may be response data of the receive agent node to the received request data packet. For example, the response data packet may be a response data packet that is fed back from the receive agent node to the request agent node on a processing result of the request data. For example, preferentially sending the retransmission request data packet may ensure that the discarded request data packet is quickly retransmitted and processed to minimize the impact on a data processing flow of the master device.

For example, after the request agent node receives the retransmission request data packet, a retry request data packet is generated based on the retransmission request data packet and the retry request data packet is sent to the receive agent node for processing. For example, as shown in FIG. 3, when the request agent node receives the retransmission request data packet (e.g., frp flit) from the receive agent node, the request agent node first caches the retransmission request data packet in the cache 301, and then send the retransmission request data packet to the response decoder 302 for decoding. For example, when the response decoder 302 determines that a data type of the request data packet is a retransmission request data packet, the response decoder sends the retransmission request data packet to a request retry unit 303.

For example, the request retry unit 303 swaps a source address and a destination address in the retransmission request data packet to generate the retry request data packet. For example, after the request retry unit 303 receives the retransmission request data packet, the source address and the destination address of the retransmission request data packet are swapped to generate the retry request data packet and notify the request table 304 to re-send a request data packet corresponding to the retransmission request data packet to the receive agent node, so as to send the request data packet that is discarded by the receive agent node to the receive agent node for reprocessing. Alternatively, in some other embodiments, the receive agent node may generate the retransmission request data packet based on identification information (e.g., an identification number) of the discarded request data packet and send the retransmission request data packet to the request agent node. After the request agent node receives the retransmission request data packet, the request agent node searches stored request data packets for a request data packet corresponding to the identification information in the retransmission request data packet for retransmission.

It should be noted that although FIG. 3 and FIG. 4 specifically illustrate that different units or modules in the request agent node and the receive agent node perform different operations, the description is merely intended to facilitate the understanding of the technical ideas of the present disclosure by those skilled in the art. For example, in a practical scenario, one operation step implemented in each of the request agent node and the receive agent node may actually require more functional units or modules to cooperate to complete, and a plurality of operation steps implemented in each of the request agent node and the receive agent node may actually be completed by a single functional unit or module. The present disclosure does not impose any limitation on the specific structures of the request agent node and the receive agent node and which part therein performs which operations, provided that the request agent node and the receive agent node can each implement the technical ideas of the method steps provided in the present disclosure.

For example, when data of the request agent node to be sent to the receive agent node includes a retry request data packet and another request data packet, the retry request data packet is preferentially sent to the receive agent node relative to the another request data packet, where the another request data packet includes a request data packet received by the request agent node from the master device. For example, the request table 304 in the request agent node sends the retry request data packet to the cache 305 and then sends the retry request data packet to the receive agent node via the cache 305. For example, when data cached in the cache 305 to be sent to the receive agent node includes a retry request data packet and another request data packet, the retry request data packet is preferentially sent to the receive agent node relative to the another request data packet. For example, the another request data packet may include a request data packet received by the request agent node from the master device. For example, preferentially sending the retry request data packet may ensure that the discarded request data packet is quickly sent to the receive agent node for processing to minimize the impact on the data processing flow of the master device.

In the foregoing data processing method provided in the present disclosure, an internal retry mechanism is provided. In the mechanism, at least one request data packet in a buffer of the receive agent node for receiving or storing requests is discarded and an internal retry response is generated to the request agent node for the discarded request data packet, and the request agent node re-sends the discarded request data packet to the receive agent node after the request agent node detects the internal retry response, so that it can be ensured that there is at least one available buffer unit (or available credit) in the buffer of the receive agent node for receiving or storing requests, thereby preventing congestion or deadlock in a network-on-chip, and it can also be ensured there is a path for rapidly transferring high-priority request data packets to a destination even in congestion scenarios.

Figure 5:
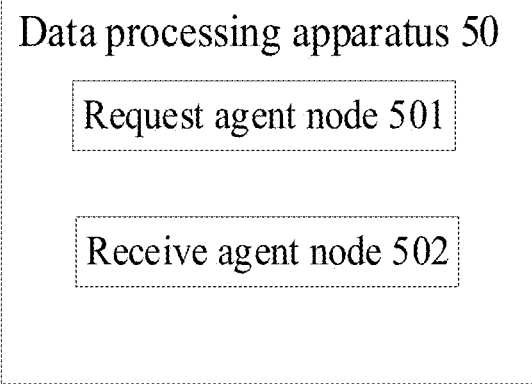
FIG. 5 is a schematic diagram of a data processing apparatus according to at least one embodiment of the present disclosure.

FIG. 5 is a schematic diagram of a data processing apparatus 50 according to at least one embodiment of the present disclosure. The data processing apparatus 50 may include a request agent node 501 and a receive agent node 502. For example, the request agent node 501 may be configured to initiate a first request data packet. For example, the receive agent node 502 may be configured to determine, in response to receiving the first request data packet, a number of available buffer units in a request receiving buffer used to receive the first request data packet; and discard, in response to the number of available buffer units being less than or equal to a first threshold, at least one request data packet stored in the request receiving buffer.

For example, the receive agent node 502 may be configured to: discard, in response to the number of available buffer units being less than or equal to the first threshold, at least one request data packet that is earliest stored in the request receiving buffer.

For example, the request receiving buffer may include a first request receiving buffer and a second request receiving buffer, and the first request receiving buffer is used to receive the request data packet and cache at least part of the received request data packet in the second request receiving buffer. For example, the receive agent node 502 may be configured to: discard, in response to the number of available buffer units in the first request receiving buffer being less than or equal to the first threshold and no free space existing in the second request receiving buffer, at least one request data packet stored in the second request receiving buffer. For example, the first threshold may be 1.

For example, the receive agent node 502 is further configured to: generate, in response to the at least one request data packet stored in the request receiving buffer being discarded, a retransmission request data packet based on the discarded request data packet and send the retransmission request data packet to the request agent node 501. For example, the request agent node 501 may be further configured to: generate, after receipt of the retransmission request data packet, a retry request data packet based on the retransmission request data packet and send the retry request data packet to the receive agent node 502 for processing. For example, the receive agent node 502 and the request agent node 501 communicate over an interconnect fabric, the request agent node 501 is located between the interconnect fabric and a master device initiating the request data packet and is used to send the request data packet to the receive agent node 502, and the receive agent node 502 is located between the interconnect fabric and a slave device receiving the request data packet and is used to receive from the interconnect fabric the request data packet from the master device.

For example, the receive agent node 502 may be configured to: preferentially send, when data to be sent to the request agent node 501 includes a retransmission request data packet and a response data packet, the retransmission request data packet to the request agent node 501 relative to the response data packet. For example, the response data packet may be response data of the receive agent node 502 to the received request data packet.

For example, the request agent node 501 may be configured to: preferentially send, when data to be sent to the receive agent node 502 includes a retry request data packet and another request data packet, the retry request data packet to the receive agent node 502 relative to the another request data packet. For example, the another request data packet may include a request data packet received by the request agent node 501 from the master device.

For example, the receive agent node 502 may be configured to: swap a source address and a destination address in the discarded request data packet to generate the retransmission request data packet.

For example, the request agent node 501 may be configured to: swap a source address and a destination address in the retransmission request data packet to generate the retry request data packet.

It should be noted that the components and structure of the data processing apparatus 50 shown in FIG. 5 are merely exemplary and non-restrictive. The data processing apparatus 50 may further include other components as desired. The data processing apparatus 50 may include more or fewer nodes or units, and the connection relationship between the nodes or units is not limited, and can be determined according to actual needs. For example, the data processing apparatus 50 may further include a request node, a subordinate node, etc.

In the foregoing data processing apparatus provided in the present disclosure, an internal retry mechanism is provided. In the mechanism, at least one request data packet in a buffer of the receive agent node for receiving or storing requests is discarded and an internal retry response is generated to the request agent node for the discarded request data packet, and the request agent node re-sends the discarded request data packet to the receive agent node after the request agent node detects the internal retry response, so that it can be ensured that there is at least one available buffer unit (or available credit) in the buffer of the receive agent node for receiving or storing requests, thereby preventing congestion or deadlock in a network-on-chip, and it can also be ensured there is a path for rapidly transferring high-priority request data packets to a destination even in congestion scenarios.

At least some embodiments of the present disclosure further provide an electronic device. The electronic device includes a processor and a memory. For example, the memory is configured to store computer-executable instructions. For example, the processor is configured to execute the computer-executable instructions. For example, when the computer-executable instructions are executed by a processor, the data processing method according to at least one embodiment of the present disclosure is implemented.

Figure 6:
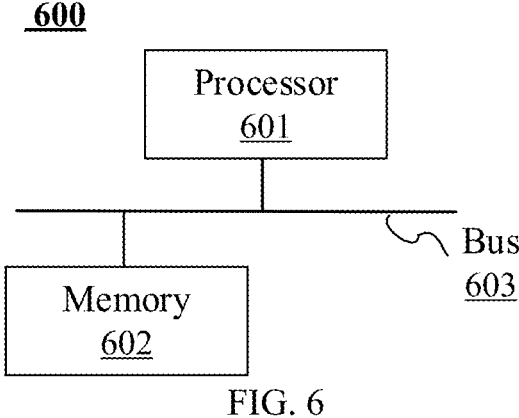
FIG. 6 is a schematic diagram of an electronic device according to at least one embodiment of the present disclosure.

FIG. 6 is a schematic diagram of an electronic device according to at least one embodiment of the present disclosure.

As shown in FIG. 6, the electronic device 600 according to this embodiment of the present disclosure includes a processor 601 and a memory 602, and the processor 601 and the memory 602 may be interconnected by a bus 603.

The processor 601 may perform various actions and processing according to a program or code stored in the memory 602. Specifically, the processor 601 may be an integrated circuit chip having a signal processing capability. For example, the processor 601 may be a general-purpose processor, a digital signal processor (DSP), an application-specific integrated circuit (ASIC), a field-programmable gate array (FPGA) or other programmable logic devices, a discrete gate or transistor logic device, or a discrete hardware component, and may implement or perform the various methods and steps disclosed in the embodiments of the present disclosure. The general-purpose processor may be a microprocessor or any conventional processor, etc., and may be of an X86 architecture, an ARM architecture, a RISC-V architecture, etc.

The memory 602 is configured to store the computer-executable instructions in a non-transitory manner, and the processor 601 is configured to run the computer-executable instructions. When the computer-executable instructions are executed by the processor 601, the data processing method according to at least one embodiment of the present disclosure is implemented.

For example, the memory 602 may be a volatile memory or a non-volatile memory, or may include both the volatile memory and the non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which acts as an external cache. By way of example but not restrictive description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct memory bus random access memory (DRRAM). It should be noted that the memory for the method described herein is intended to include, but is not limited to, these and any other suitable types of memories.

In the foregoing electronic device provided in the present disclosure, an internal retry mechanism is provided. In the mechanism, at least one request data packet in a buffer of the receive agent node for receiving or storing requests is discarded and an internal retry response is generated to the request agent node for the discarded request data packet, and the request agent node re-sends the discarded request data packet to the receive agent node after the request agent node detects the internal retry response, so that it can be ensured that there is at least one available buffer unit (or available credit) in the buffer of the receive agent node for receiving or storing requests, thereby preventing congestion or deadlock in a network-on-chip, and it can also be ensured there is a path for rapidly transferring high-priority request data packets to a destination even in congestion scenarios.

At least one embodiment of the present disclosure further provides a non-transitory storage medium that stores computer-executable instructions in a non-transitory manner. For example, when the computer-executable instructions are executed by a processor, the data processing method according to at least one embodiment of the present disclosure is implemented.

Figure 7:
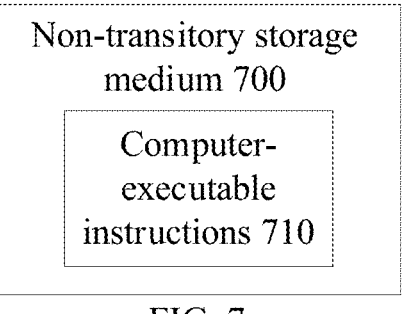
FIG. 7 is a schematic diagram of a non-transitory storage medium according to at least one embodiment of the present disclosure.

FIG. 7 is a schematic diagram of a non-transitory storage medium according to some embodiments of the present disclosure. As shown in FIG. 7, the non-transitory storage medium 700 may store computer-executable instructions 710 in a non-transitory manner, and when the computer-executable instructions 710 are executed by a computer, the data processing method according to any embodiment of the present disclosure is implemented.

Similarly, the non-transitory storage medium in this embodiment of the present disclosure may be a volatile memory or a non-volatile memory, or may include both the volatile memory and the non-volatile memory. It should be noted that the memory for the method described herein is intended to include, but is not limited to, these and any other suitable types of memories.

The technical effect of the foregoing non-transitory storage medium is the same as the technical effect of the foregoing data processing method and will not be repeated herein.

It should be noted that the flowchart and block diagram in the accompanying drawings illustrate the possibly implemented architecture, functions, and operations of the system, method, and computer program product according to various embodiments of the present disclosure. In this regard, each block in the flowcharts or block diagram may represent a module, program segment, or part of code, and the module, program segment, or part of code contains at least one executable instruction for implementing the specified logical functions. It should also be noted that, in some alternative implementations, the functions marked in the blocks may also occur in an order different from that marked in the accompanying drawings. For example, two blocks shown in succession can actually be performed substantially in parallel, or they can sometimes be performed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

Generally, various example embodiments of the present disclosure may be implemented in hardware or special-purpose circuits, software, firmware, logic, or any combination thereof. Some aspects may be implemented in hardware, while other aspects may be implemented in firmware or software that may be executed by a controller, a microprocessor, or another computing device. When aspects of the embodiments of the present disclosure are illustrated or described as block diagrams, flow diagrams, or using some other graphical representations, it will be understood that the blocks, apparatuses, systems, techniques, or methods described herein may be implemented as non-limiting examples in hardware, software, firmware, special-purpose circuits or logic, general-purpose hardware or controllers or other computing devices, or some combinations thereof.

In addition to the above exemplary description, the following points need to be explained for the present disclosure:

(1) The accompanying drawings of the embodiments of the present disclosure relate only to structures involved in the embodiments of the present disclosure, and for other structures, reference may be made to general designs.

(2) For the sake of clarity, in the accompanying drawings used to describe the embodiments of the present disclosure, the thickness and size of a layer or structure are exaggerated. It may be understood that when an element such as a layer, film, region, or substrate is referred to as being "on" or "under" another element, the element may be located "directly" "on" or "under" the another element, or an intermediate element may exist.

(3) The embodiments of the present disclosure and features in the embodiments may be combined with each other without conflict, to obtain new embodiments.

The above description illustrates merely specific implementations of the present disclosure, but is not intended to limit the scope of protection of the present disclosure. The scope of protection of the present disclosure shall be subject to the scope of protection of the claims.

The invention claimed is:

1. A data processing method, comprising:
determining, in response to receiving a first request data packet, a number of available buffer units in a request receiving buffer configured to receive the first request data packet in a receive agent node, wherein the request receiving buffer comprises a first request receiving buffer and a second request receiving buffer;
discarding, in response to the number of available buffer units being less than or equal to a first threshold, at least one request data packet stored in the request receiving buffer, wherein the discarding, in response to the number of available buffer units being less than or equal to a first threshold, at least one request data packet stored in the request receiving buffer comprises:
discarding, in response to the number of available buffer units in the first request receiving buffer being less than or equal to the first threshold and no free space existing in the second request receiving buffer, the at least one request data packet stored in the second request receiving buffer; and
generating, in response to the at least one request data packet stored in the request receiving buffer being discarded, a retransmission request data packet based on the discarded request data packet and sending the retransmission request data packet to a request agent node, wherein the generating the retransmission request data packet based on the discarded request data packet and sending the retransmission request data packet to the request agent node comprises:
Sending, when data of the receive agent node to be sent to the request agent node comprises the retransmission request data packet and a response data packet, the retransmission request data packet to the request agent node relative to the response data packet, wherein the response data packet is response data of the receive agent node to the received request data packet.

2. The data processing method according to claim 1, wherein the discarding, in response to the number of available buffer units being less than or equal to a first threshold, at least one request data packet stored in the request receiving buffer comprises: discarding, in response to the number of available buffer units being less than or equal to the first threshold, at least one request data packet that is earliest stored in the request receiving buffer.

3. The data processing method according to claim 1, wherein the first threshold is 1.

4. The data processing method according to claim 1, further comprising:
generating, after the request agent node receives the retransmission request data packet, a retry request data packet based on the retransmission request data packet and sending the retry request data packet to the receive agent node for processing, wherein the receive agent node and the request agent node communicate over an interconnect fabric, the request agent node is located between the interconnect fabric and a master device initiating the first request data packet and is configured to send the request data packet to the receive agent node, and the receive agent node is located between the interconnect fabric and a slave device receiving the first request data packet and is configured to receive from the interconnect fabric the request data packet from the master device.

5. The data processing method according to claim 4, wherein the generating,
after the request agent node receives the retransmission request data packet, a retry request data packet based on the retransmission request data packet and sending the retry request data packet to the receive agent node for processing comprises:
preferentially sending, when data of the request agent node to be sent to the receive agent node comprises a retry request data packet and another request data packet, the retry request data packet to the receive agent node relative to the another request data packet, wherein the another request data packet comprises the request data packet received by the request agent node from the master device.

6. The data processing method according to claim 1, wherein
the generating the retransmission request data packet based on the discarded request data packet comprises:
swapping a source address and a destination address in the discarded request data packet to generate the retransmission request data packet.

7. The data processing method according to claim 4, wherein the generating a retry request data packet based on the retransmission request data packet comprises:
swapping a source address and a destination address in the retransmission request data packet to generate the retry request data packet.

8. An electronic device, comprising:
a memory configured to store computer-executable instructions; and
a processor configured to execute the computer-executable instructions,
wherein the computer-executable instructions, when executed by the processor, cause the processor to implement operations, and the operations comprise:
determining, in response to receiving a first request data packet, a number of available buffer units in a request receiving buffer configured to receive the first request data packet in a receive agent node, wherein the request receiving buffer comprises a first request receiving buffer and a second request receiving buffer;
discarding, in response to the number of available buffer units being less than or equal to a first threshold, at least one request data packet stored in the request receiving buffer, wherein the discarding, in response to the number of available buffer units being less than or equal to a first threshold, at least one request data packet stored in the request receiving buffer comprises:

discarding, in response to the number of available buffer units in the first request receiving buffer being less than or equal to the first threshold and no free space existing in the second request receiving buffer, the at least one request data packet stored in the second request receiving buffer; and generating, in response to the at least one request data packet stored in the request receiving buffer being discarded, a retransmission request data packet based on the discarded request data packet and sending the retransmission request data packet to a request agent node, wherein the generating the retransmission request data packet based on the discarded request data packet and sending the retransmission request data packet to the request agent node comprises:

sending, when data of the receive agent node to be sent to the request agent node comprises the retransmission request data packet and a response data packet, the retransmission request data packet to the request agent node relative to the response data packet, wherein the response data packet is response data of the receive agent node to the received request data packet.

9. The electronic device according to claim 8, wherein the discarding, in response to the number of available buffer units being less than or equal to a first threshold, at least one request data packet stored in the request receiving buffer comprises:

discarding, in response to the number of available buffer units being less than or equal to the first threshold, at least one request data packet that is earliest stored in the request receiving buffer.

10. The electronic device according to claim 8, wherein the first threshold is 1.

11. The electronic device according to claim 8, wherein the operations further comprise:

generating, after the request agent node receives the retransmission request data packet, a retry request data packet based on the retransmission request data packet and sending the retry request data packet to the receive agent node for processing, wherein the receive agent node and the request agent node communicate over an interconnect fabric, the request agent node is located between the interconnect fabric and a master device initiating the first request data packet and is configured to send the request data packet to the receive agent node, and the receive agent node is located between the interconnect fabric and a slave device receiving the first request data packet and is configured to receive from the interconnect fabric the request data packet from the master device.

12. The electronic device according to claim 11, wherein the generating, after the request agent node receives the retransmission request data packet, a retry request data packet based on the retransmission request data packet and sending the retry request data packet to the receive agent node for processing comprises:

preferentially sending, when data of the request agent node to be sent to the receive agent node comprises a retry request data packet and another request data packet, the retry request data packet to the receive agent node relative to the another request data packet, wherein the another request data packet comprises the request data packet received by the request agent node from the master device.

13. The electronic device according to claim 8, wherein the generating the retransmission request data packet based on the discarded request data packet comprises:

swapping a source address and a destination address in the discarded request data packet to generate the retransmission request data packet.

14. The electronic device according to claim 11, wherein the generating a retry request data packet based on the retransmission request data packet comprises:

swapping a source address and a destination address in the retransmission request data packet to generate the retry request data packet.

15. A non-transitory storage medium, storing computer-executable instructions in a non-transitory manner, wherein the computer-executable instructions, when executed by a processor, cause the processor to implement operations, and the operations comprise:

determining, in response to receiving a first request data packet, a number of available buffer units in a request receiving buffer configured to receive the first request data packet in a receive agent node, wherein the request receiving buffer comprises a first request receiving buffer and a second request receiving buffer;

discarding, in response to the number of available buffer units being less than or equal to a first threshold, at least one request data packet stored in the request receiving buffer, wherein the discarding, in response to the number of available buffer units being less than or equal to a first threshold, at least one request data packet stored in the request receiving buffer comprises:

discarding, in response to the number of available buffer units in the first request receiving buffer being less than or equal to the first threshold and no free space existing in the second request receiving buffer, at least one request data packet stored in the second request receiving buffer; and generating, in response to the at least one request data packet stored in the request receiving buffer being discarded, a retransmission request data packet based on the discarded request data packet and sending the retransmission request data packet to a request agent node, wherein the generating the retransmission request data packet based on the discarded request data packet and sending the retransmission request data packet to the request agent node comprises:

sending, when data of the receive agent node to be sent to the request agent node comprises the retransmission request data packet and a response data packet, the retransmission request data packet to the request agent node relative to the response data packet, wherein the response data packet is response data of the receive agent node to the received request data packet.

16. The non-transitory storage medium according to claim 15, wherein the first threshold is 1.

17. The non-transitory storage medium according to claim 15, the operations further comprising: and generating, after the request agent node receives the retransmission request data packet, a retry request data packet based on the retransmission request data packet and sending the retry request data packet to the receive agent node for processing, wherein the receive agent node and the request agent node communicate over an interconnect fabric, the request agent node is located between the interconnect fabric and a master device initiating the first request data packet and is configured to send the request data packet to the receive agent node, and the receive agent node is located between the interconnect fabric and a slave device receiving the first request data packet and is configured to receive from the interconnect fabric the request data packet from the master device.

18. The non-transitory storage medium according to claim 15, the operations further comprising: discarding, in response to the number of available buffer units being less than or equal to the first threshold, at least one request data packet that is earliest stored in the request receiving buffer.

19. The non-transitory storage medium according to claim 15, wherein the generating the retransmission request data packet based on the discarded request data packet comprises:

swapping a source address and a destination address in the discarded request data packet to generate the retransmission request data packet.

* * * * *